Jan. 28, 1947.  W. F. PENROSE  2,415,035
HYDRAULIC BRAKE MECHANISM
Filed Sept. 19, 1944  3 Sheets-Sheet 1
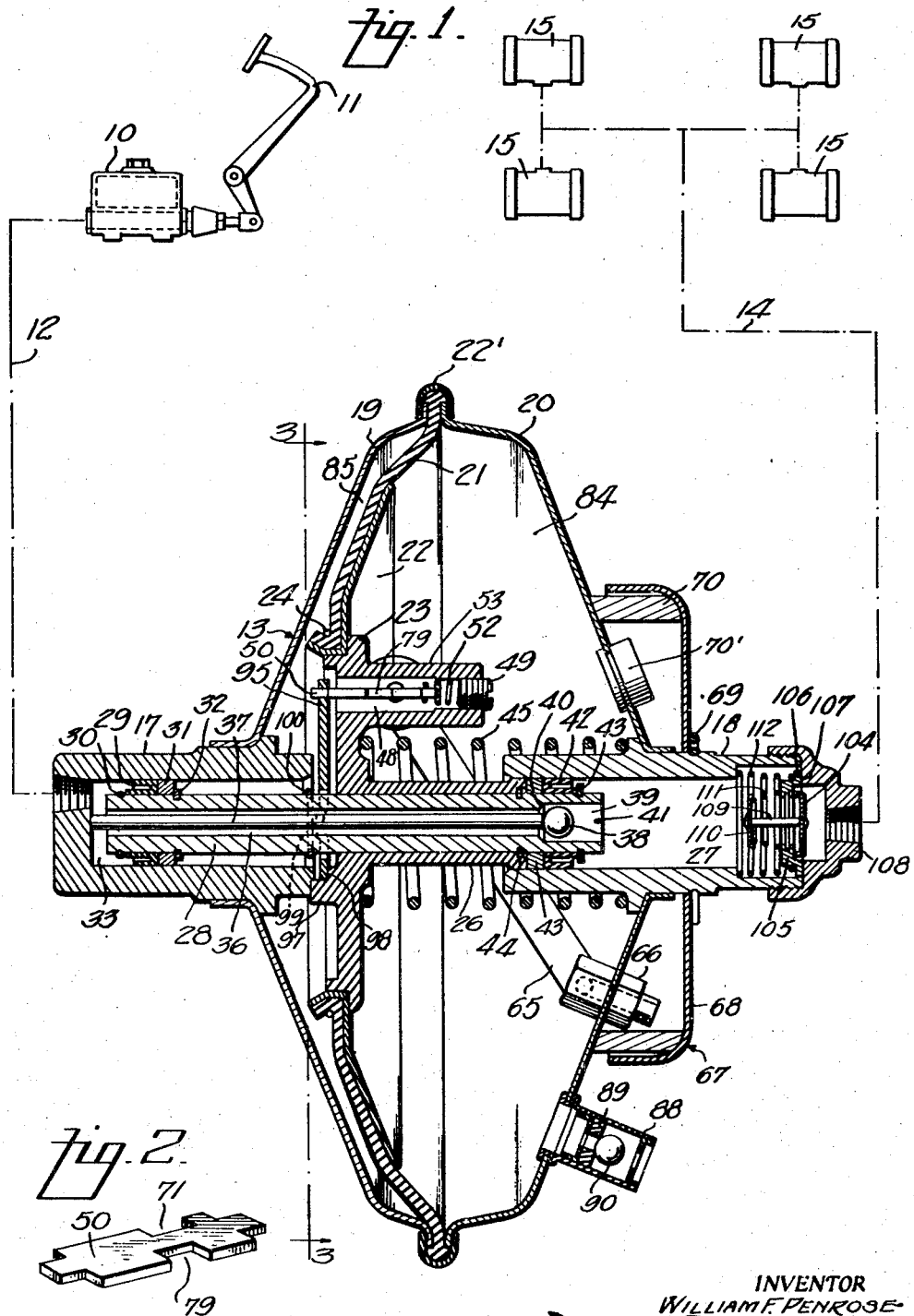
INVENTOR
WILLIAM F. PENROSE
ATTORNEYS

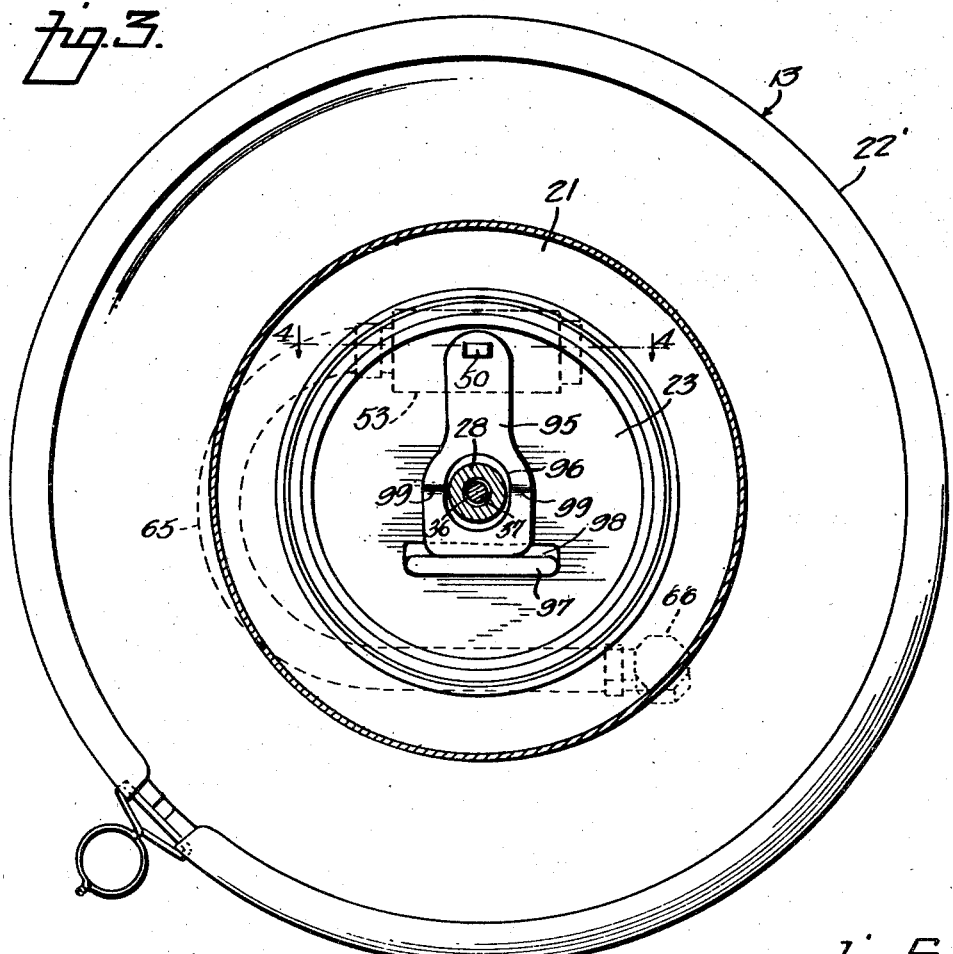

Jan. 28, 1947. W. F. PENROSE 2,415,035
HYDRAULIC BRAKE MECHANISM
Filed Sept. 19, 1944 3 Sheets-Sheet 3
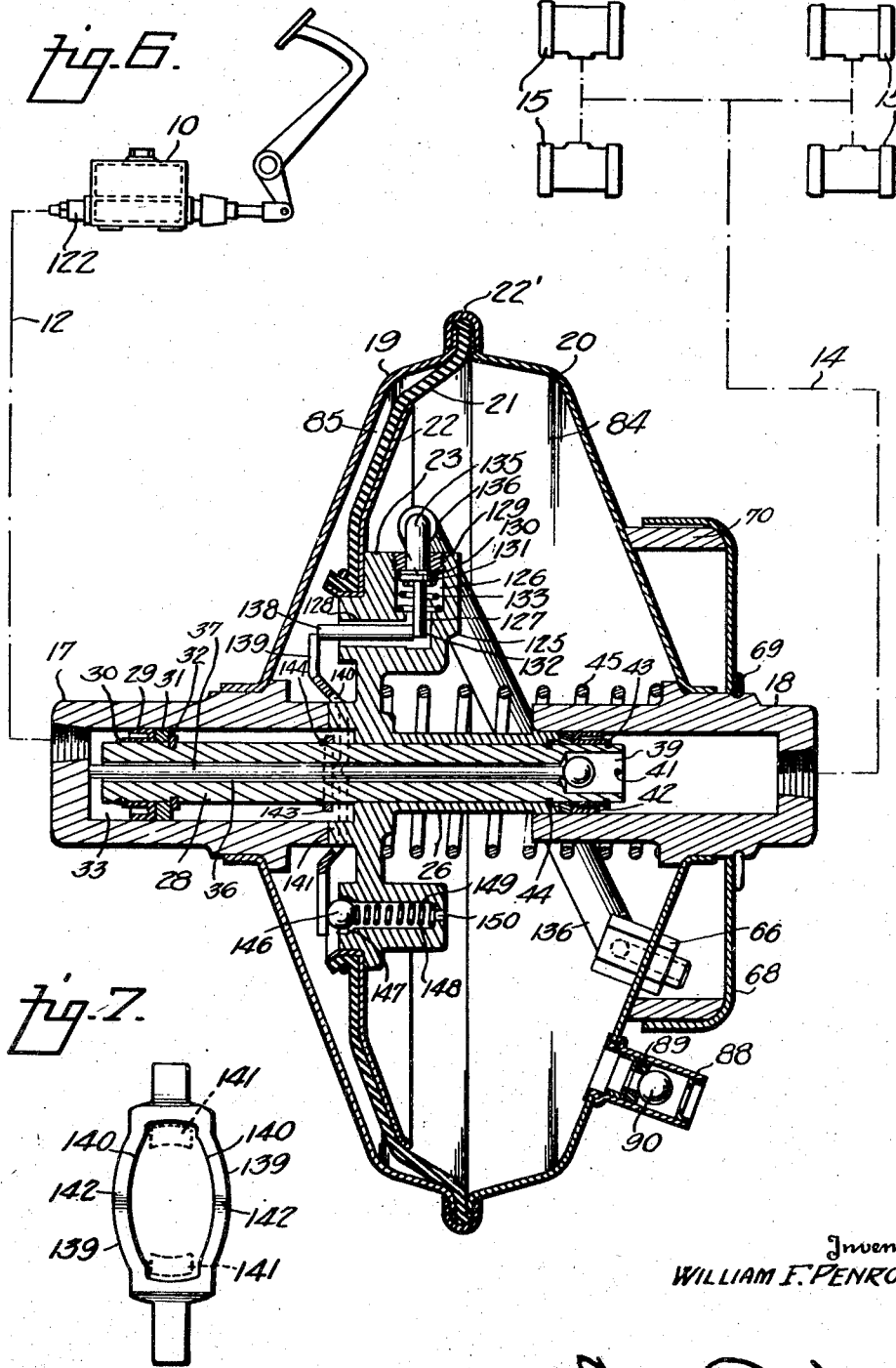
Inventor
WILLIAM F. PENROSE
By C. L. Parker
Attorney Patented Jan. 28, 1947

2,415,035

UNITED STATES PATENT OFFICE 2,415,035

HYDRAULIC BRAKE MECHANISM

William F. Penrose, Newark, N. J., assignor to Empire Electric Brake Company, Newark, N. J., a corporation of New Jersey Application September 19, 1944, Serial No. 554,770

17 Claims. (Cl. 60—54.5)

This invention relates to hydraulic brake mechanisms, and more particularly to a mechanism of the booster type wherein the booster unit is connected by hydraulic lines to the master cylinder and to the wheel cylinders to respond to brake pedal operation to generate forces for assisting in the application of the brakes.

Substantial developments have taken place in the type of brake mechanisms referred to above and prior devices of this type have reached a stage of substantial efficiency in operation. However, there is still much to be desired in the performance of a brake of this character. For example, most hydraulic booster brake mechanisms recently developed are of the type employing fluid pressure motors to boost the pedal-applied braking action. Such a motor is controlled by fluid flowing to and from the master cylinder through the medium of fluid control valves one of which admits relatively high pressure into one side of the motor to effect motor operation. Such higher pressure valves are conventionally seated and are opened against the combined forces exerted by the source of higher pressure and a valve-seating spring. Accordingly, the operator at the "cut-in" point at which the motor comes into operation, encounters substantial resistance in initiating motor operation. The force generated to overcome the fluid and spring pressures becomes excessive the instant the valve is unseated, the higher fluid pressure no longer tending to seat the valve. Under such circumstances, there is a sudden drop in resistance felt by the operator, and the air valves open too wide with the result that the booster motor tends to overshoot.

An important object of the present invention is to provide a substantially improved valve structure and operation for the motors of booster brake mechanisms whereby initial motor operation is effected without the exertion of a substantially increased pedal-generated pressure at the motor "cut-in" point.

A further object is to provide such a mechanism wherein the valves are of such nature as to be more easily operated and to provide a better graduation in the flow of fluid through the valves, thus providing smoother and more accurate motor control.

A further object is to provide such a mechanism wherein valve movement relative to a given displacement of fluid from the master cylinder is very greatly increased to provide instantaneous response of the motor to operation of the brake pedal.

A further object is to provide novel means for determining the pedal-generated pressure necessary to initiate motor operation at the "cut-in" point thus permitting initial motor operation to take place in accordance with the line pressure necessary to set the brake shoes against the brake drums before the booster comes into operation.

A further object is to provide a novel valve arrangement of such character as to render it impossible for both valves to be open at the same time.

Other objects and advantages of the invention will become apparent during the course of the following description.

In the drawings I have shown several embodiments of the invention. In this showing:

Figure 1 is an axial sectional view through the preferred type of booster mechanism, the master cylinder, wheel cylinders and the lines connecting them to the booster mechanism being diagrammatically represented, Figure 2 is a detail perspective view of the valve actuating element, Figure 3 is a transverse sectional view on line 3—3 of Figure 1, Figure 4 is a detail fragmentary sectional view on line 4—4 of Figure 3, Figure 5 is a similar view showing a modified form of vacuum valve arrangement, Figure 6 is a view similar to Figure 1 showing a modified form of brake mechanism, and Figure 7 is a face view of the valve operating lever shown in Figure 6.

Referring to Figure 1, the numeral 10 designates a master cylinder which is conventional except for the provision of the usual automatic valve for retaining residual pressure in the braking system, such valve device being associated with the booster as will be referred to later. The master cylinder is provided with the usual piston (not shown) operable by a brake pedal 11 for displacing hydraulic brake fluid from the master cylinder through a line 12. This line leads to the booster mechanism indicated as a whole by the numeral 13, and hydraulic fluid is displaced from the booster through lines 14 to the usual brake cylinders 15.

The booster mechanism comprises a pair of cylinders 17 and 18 arranged in axial alinement and spaced from each other, and these cylinders are carried by the casings or shells 19 and 20 of a fluid pressure motor. This motor has a pressure responsive element preferably in the form of a diaphragm 21 having its periphery arranged between the peripheral edges of the shells 19 and 20, and the latter are clamped against the diaphragm by a suitable clamping band 22'. The diaphragm is arranged against a diaphragm plate 22 pressed on or otherwise secured to a piston plate 23, the diaphragm having its inner edge secured to the plate 22 in any manner, for example by a wire 24.

The plate 23 is preferably formed integral with a piston 26 the free end of which extends into the cylinder 18, the space 27 within this cylinder being the high pressure chamber of the booster as will become apparent. A plunger 28 is slidable in the piston 26 and has one end projecting into the high pressure chamber 27, as shown. The other end of the plunger 28 carries a seal 29 retained on the plunger 28 by a snap ring or the like 30 and backed up by a pressure ring 31 engaging a snap ring 32 carried by the plunger 28. The seal 29 and the adjacent end of the plunger 28 form a piston operable in the cylinder 17 and the space between such piston and the adjacent end of the cylinder 17 constitutes a primary or low pressure chamber 33 which communicates with the line 12.

The plunger 28 is provided with a bore 36 in which is arranged a rod 37 one end of which is engageable with the outer end of the cylinder 17 and the other end of which is engageable with a ball 38 arranged in an enlarged recess 39 formed in the adjacent end of the plunger 28. This ball is engageable, in a manner to be described, with a seat 40 formed at the inner end of the recess 39 and a pin 41 prevents the ball 38 from leaving the recess 39. When the parts are in the "off" position shown in Figure 1 the chambers 27 and 33 communicate with each other through the bore 36 and around the ball 38.

A seal 42 surrounds the right hand end of the plunger 28 as viewed in Figure 1 and is retained by a snap ring 43. The seal 42 is backed up by a ring 43 engageable by a snap ring 44 carried by the plunger 28 and normally spaced from the ring 43 so that the plunger 28 is free to partake of limited movement toward the right in Figure 1 without engaging the ring 43. The elements 22, 23 and 26 constitute the pressure movable unit as a whole of the motor, and a spring 45 urges such unit to the "off" position shown in Figure 1.

The valve mechanism for controlling the fluid pressure motor is shown in Figures 1 and 4. The plate 23 is provided with a passage 48 the right hand end of which is slightly reduced and threaded to receive an adjusting plug 49. A valve actuating element 50 extends through the passage 48 and has a reduced inner end 51 engaged in one end of a compression spring 52, the other end of which engages the plug 49.

The passage 48 extends through an enlargement 53 preferably formed integral with the plate 23, and such enlargement is provided with a pair of chambers 54 and 55. A valve seat insert 57 is threaded into the end of the chamber 54 and is engageable by the rubber or similar face 58 of a valve body 59 carried by a depending stem 60 extending through an opening 61 communicating between the chamber 54 and passage 48. A spring 62 urges the valve element 58 to closed position. The valve insert 57 carries a nipple 64 to the outer end of which is connected a flexible pipe or hose 65 leading to a nipple 66 extending through the motor shell 20 and communicating with the interior of an air cleaner 67 (Figure 1). This air cleaner comprises a shell 68 fixed with respect to the cylinder 18 by a wire or the like 69, and a cleaning element 70 is arranged within the shell 68. Access to the screw 49 is had by removal of a rubber or similar plug 70'. The valve operating element 50 is notched as at 71 to receive the free end of the valve stem 60, the length of the notch 71 being greater than the thickness of the stem 60 for a purpose to be described.

A valve seat insert 74 is threaded into the end of the chamber 55 and is engageable by a rubber valve element 75 carried by a valve body 76, the insert 74 being preferably provided with an extended flange 77 to prevent lateral displacement of the valve element 76 relative to its seat. The valve body 76 carries a stem 78 engageable with a notch 79 formed in the valve operating element 50. In the normal position of the parts, the right hand end of the notch 79 engages the valve stem 76 to hold the latter in such position that the valve element 75 is rocked from its seat as shown in Figure 4, the valve stem 60 under such conditions being spaced from opposite ends of the notch 71. A spring 80 urges the valve element 75 toward its seat, and the stem 78 projects through an opening 81 connecting the chamber 55 to the passage 48.

The valves referred to control the pressures in the motor chambers 84 and 85. With the parts in the positions shown in Figure 4, the normal unseating of the valve element 75 connects the chambers 84 and 85 through the chamber 55, opening 81 and passage 48. At the same time, the valve element 58 is normally seated to close communication between the passage 48, and consequently the motor chamber 85, and the atmosphere through hose 84. The motor shell 20 is provided with a nipple 88 (Figure 1) which is connected to a source of partial vacuum, preferably the intake manifold. A preferably rubber valve seat 89 is arranged in the nipple 88 and engageable by a ball check valve 90 to prevent sudden increases in pressure in the chamber 84. In the embodiment of the invention illustrated the motor is of the so-called vacuum operated type and the normal unseating of the valve element 75 "vacuum suspends" the pressure responsive unit of the motor. It will become apparent that the motor may be operated by super-atmospheric pressure, in which case the nipple 88 would be open to the atmosphere and the fitting 66 would be connected to a source of super-atmospheric pressure.

A valve operating plate or lever 95 controls the valve operating element 50 to determine the operation of the valves shown in Figure 4. The plate 95 (Figures 1 and 3) is apertured as at 96 to loosely receive the plunger 28 and the lower end of the plate rests upon a flange 97 formed integral with the plate 23. The plate 95 functions as a lever, as will become apparent, and has its lower end engaged against a shoulder 98 formed integral with the plate 23 and function to fulcrum the lower end of the plate 95. In the plane of the axis of the motor, the plate 95 is bulged to provide ribs 99 engageable with a snap ring 100 carried by the plunger 28. Obviously, movement of this plunger toward the right as viewed in Figure 1 will rock the plate 95 to transmit movement to the valve actuating element 50.

For reasons to be referred to later, the automatic valve means which retains residual pressure in the braking system is arranged at the outlet end of the chamber 27 instead of at the outlet end of the master cylinder 10. As shown in Figure 1 a valve element 104 is engageable with a seat 105 formed as part of a valve 106 which is engageable, in turn, with a seat 107 formed in a cap 108 which may be threaded on the end of the cylinder 18. The valve 104 carries a stem 109 on the end of which is arranged a spring seat 110, and a spring 111 is arranged between this seat and the valve seat 105 to tend to hold the valve 104 closed. Similarly, a spring 112 engages the valve element 106 to tend to hold it on its seat. The valve 104 is opened under the influence of pressure in the chamber 27 for the flow of brake fluid to the wheel cylinders, while the valve element 106 is opened by pressure in the line 14 and brake cylinders when the pressure in the chamber 27 drops incident to the releasing of the brakes. The spring 112 is designed to be unseated only by pressures exceeding the desired residual pressure in the line 14 and in the brake cylinders.

The form of the valve mechanism shown in Figure 5 is very similar to the form shown in Figure 4. In the latter, the spring 62 operates against atmospheric pressure. Similarly the spring 80 causes the valve element 75 to be seated against differential pressures tending to unseat the valve element 75 when pressure in the chamber 55 exceeds pressure in the motor chamber 84. Such an arrangement is highly important and since this is particularly true with respect to the valve element 58 and spring 62, the spring action may be reversed with respect to the vacuum control valve. Such an arrangement has been shown in Figure 5, but is not preferred. In Figure 5 the chamber 55 is provided with a valve insert 115 engageable by a rubber or similar valve element 116 carried by a valve body 117, the stem 118 of which functions in the same manner as the stem 78. A spring 119 urges the valve element 116 toward its seat, and the spring force in this case is in the same direction as the differential pressures tending to seat the valve element 116 when pressure in the chamber 55 exceeds pressure in the motor chamber 84. It is preferred that the arrangement shown in Figure 4 be employed.

A modified form of the invention is shown in Figure 6. In this case, the master cylinder 10 may be conventional and provided with the usual residual pressure retaining valve device indicated by the numeral 122. This valve device is interposed in the line 12. Except for the particular valves and operating means therefor, the booster shown in Figure 5 is substantially identical with the form of the invention previously described and the same numerals have been used to indicate the corresponding parts. The motor plate 23 is provided with a boss 125 in which is formed a chamber 126 communicating through a port 127 with a passage 128 leading to the motor chamber 85. A valve insert 129 is threaded into the end of the chamber 126 and is engageable by a rubber or similar valve element 130 carried by a valve body 131, carrying a valve stem 132 and urged to closed position by a spring 133. The valve insert 129 is connected to a nipple 135, and a flexible hose 136 is connected at one end to this nipple and at its opposite end to the fitting 66.

The valve stem 132 is engageable by a rod 138 extending through the passage 128 and having its projecting end engaging the upper end of a lever 139. This lever is apertured as at 140 to straddle the plunger 28 and opposite lugs 141 (Figures 6 and 7) formed integral with the plate 23. The upper of these lugs limits downward movement of the lever 139 and the two lugs 141 prevent rocking movement of the lever about the axis of the motor. Intermediate its ends, the lever 139 is bulged as at 142 to provide opposite ribs engageable with an operating ring 143 retained in position by a snap ring 144 carried by the plunger 28.

The lower end of the lever 139 engages a ball valve 146 normally held from its seat 147 by a spring 148. This spring is arranged in a recess 149 communicating with the motor chamber 84 through a port 150.

The operation of the form of the invention shown in Figures 1 to 4 inclusive is as follows:

When the brakes are to be applied, the operator depresses the pedal 11 to displace fluid from the master cylinder 10 into the chamber 33, the flow of fluid taking place freely so far as the master cylinder is concerned because of the removal of the pressure retaining valve from the outlet side of the master cylinder and the placing of such valve in the outlet of the high pressure chamber 27. Fluid flowing into the chamber 33 is free to flow relatively unrestrictedly through the bore 36 into the chamber 27, and thence around the valve 104 into the brake lines 14. The valve 104 is identical with and operable in the same manner as the corresponding valve usually employed at the outlet of the master cylinder. The brake fluid flows in the manner stated until play is taken up between the brake shoes and the brake drums, whereupon there will be an immediate building up of the pressure in the entire system from the master cylinder to the wheel cylinders. Inasmuch as the area of the chamber 33 and the piston operable therein is greater than the area of the right hand end of the plunger 28, such plunger will be moved toward the right to rock the valve operating plate or lever 95.

Movement of the plunger 28 swings the lever 95 in a clockwise direction about the lower end of the lever, and the valve operating element 50 will be moved toward the right as viewed in Figures 1 and 4. Referring to Figure 4 it will be noted that the left hand end of the element 50 is shouldered and is provided with a reduced end projecting through the lever 95, the shoulder portion of the element 50 being seated against the lever 95 by the action of the spring 52. The upper end of the valve stem 78 (Figure 4) is engaged against the right hand end of the notch 79 to normally connect the motor chambers 84 and 85 (Figure 1) while the lower end of the valve stem 60 (Figure 4) is spaced from the left hand end of the notch 71. Immediately upon movement of the lever 95 and element 50 in the manner stated, the spring 80 starts to seat the valve element 75, the stem 78 being freed to swing toward vertical position as the operating element 50 moves.

Approximately at the point at which the valve element 75 becomes fully seated, the left hand end of the notch 71 will engage the lower end of the valve stem 60 (Figure 4) to rock this stem and the valve body 59 against the tension of the spring 62 to unseat the valve element 58. The closing of the valve element 75 disconnects the motor chambers 84 and 85 from each other, but the valve chamber 84 is in constant communication with the intake manifold through the nipple 88 and accordingly reduced pressure is always present in the chamber 84. The second step in the operation referred to, namely, the unseating of the valve element 58, admits air through chamber 54 and passage 48 into the motor chamber 85, thus establishing differential pressures to move the pressure responsive unit of the motor toward the right.

Initial valve operating movement of the plunger 28 (Figure 1) will have moved the snap ring 44 out of engagement with the adjacent shoulder of the piston sleeve 26 and when the latter is moved as a part of the pressure movable unit of the motor, it will effect movement of the ring 43 and seal 42. Thus both the plunger 28 and seal 42, constituting a piston surrounding the right hand end of the plunger 28 (Figure 1) will displace fluid from the chamber 27 at a pressure substantially higher than that generated in the master cylinder. This higher pressure acts against the right hand end of the plunger 28 to provide the brake pedal with the desired "feel" or reaction and the operator performs part of the work in applying the brakes, the proportion of the work done by the operator being equal to the ratio of the area of the right hand end of the plunger 28 to the cross sectional area of the chamber 27.

It will be apparent that as soon as movement of the plunger 28 starts, the rod 37 will release the ball 38 to engage its seat, this arrangement in itself now being conventional and providing the passage 36 through which play between the brake shoes and drums is taken up prior to actuation of the motor and prior to any substantial movement of the plunger 28. As soon as movement of the plunger 28 stops, an extremely slight additional movement of the pressure responsive unit of the motor will reverse movement of the lever 95 and the spring 52 (Figure 4) will move the element 50 toward the left until the valve element 58 seats to cut off the flow of air into the chamber 85. Any tendency for the motor to overrun will result in "cracking" the valve element 75 to exhaust some of the air from the chamber 85 into the chamber 84 until the proper differential pressure is restored to retain the proper proportional pressure in the high pressure end of the system.

When the brakes are to be released, the operator will release the pedal 11 whereupon pressure in the chamber 27 will move the plunger 28 to the left to reverse the valve operation, the valve element 75 being opened as in Figure 4 to balance pressures in the motor chambers 84 and 85. Pressure in the chamber 27 and the force of the spring 45 will return the parts to the off position, the valve 106 (Figure 1) opening against the spring 102 to permit brake fluid to return through the lines 14 into the chamber 27. The valve element 106 seats under proper pressure conditions to retain the desired residual pressure in the brake cylinders and the lines 14.

The valve mechanism is of particular importance. Heretofore, in a device of this character, for example in the mechanism disclosed in the copending application of Rudolph J. Klimkiewicz, Serial No. 504,451, filed September 30, 1943, now Patent No. 2,377,699, a lever corresponding to the lever 95 has its opposite ends engageable with an air valve and a vacuum valve respectively, performing the same functions as the valve elements 58 and 75. In such arrangement it has been the common practice to employ a spring for seating the air valve which acts in the same direction as the atmospheric pressure tending to seat such valve. At the "cut-in" point of the motor, that is, the point at which play has been taken up between the brake shoes and the brake drums and the motor is about to become operative, it requires an appreciable increase in pressure in the master cylinder end of the system to open the air valve. This causes a "lumpy" operation, and the cracking of the air valve immediately substantially reduces one of the forces tending to hold the air valve closed with the result that the pressure built up to open the air valve becomes excessive and the valve is opened to too great an extent, thus causing the motor to tend to "over shoot." Moreover, the sudden drop in pressure in the low pressure end of the system causes the pedal 11 to move to an excessive extent under the pressure being exerted to open the air valve. This increases the tendency for the motor to "over shoot." This fault in the operation of prior devices of this character is not serious, but is definitely noticeable and annoying. In an apparatus such as the present one, the fault becomes a matter of serious concern. In order to provide an instantaneous response of the motor to the brake pedal in a device of this character, efforts have been made to multiply the speed and distance of movement of the control valves and their parts relative to the displacement of fluid from the master cylinder to provide for a rapid substantial energization of the motor. This has been accomplished to a substantial extent in the structure of the copending application referred to above, the valves being operated at a 2:1 ratio with respect to the displacement of fluid from the master cylinder. It is desirable to provide an even greater ratio, and this has been accomplished in the present case by the operation of both valves from the same end of the lever 95, thus permitting a substantial increasing in the lever ratio for operating the valves. The fulcrum point 98 may be arranged very close to the point of operation 99 of the lever 95 while the upper end of this lever arm as viewed in Figure 1 may be relatively long. Such an arrangement provides for extremely rapid motor response, but it greatly aggravates the faulty condition referred to above occurring incident to the opening of the air valve. The air valve construction in the present case is highly advantageous for two reasons. In the first place, while an economical type of poppet valve is employed, the valve is rocked on its seat instead of being directly opened thus providing for a finer graduation of the admission of air, this being true also of the vacuum valve 75 as referred to below. In the second place, the spring 62 acts against the air pressure, the latter in the present case tending to unseat rather than to seat the air valve as in prior constructions. With such an arrangement, the spring 62 merely overbalances the air pressure to whatever extent is necessary to normally hold the valve element seated. In other words, in the device as illustrated, the force tending to seat the valve element 58, is the force of the spring 62 minus the air pressure acting on the top of the valve element 58 as viewed in Figure 4. Accordingly it is unnecessary to build up a substantial hydraulic pressure in the chamber 33 at the motor "cut-in" point. A much smoother operation is accordingly provided.

Moreover, the present device provides for the positive successive operations of the vacuum and air valves, whereas in prior constructions, for example in the Klimkiewicz construction, the springs acting against the vacuum and air valves had to be of such definite relative strengths as to cause the lever to first close the vacuum valve without operating the air valve. It was possible to operate both valves simultaneously if the brake pedal were depressed very suddenly under emergency conditions. Referring to Figure 4 it will be noted that the valve operating element 50 functions to positively release the vacuum valve before unseating the air valve.

Another distinct advantage of the present construction lies in the fact that the force necessary to open the air valve element 58 is adjustable, this being accomplished by adjusting the tension of the spring 52 by turning the threaded plug 49. The plug 49 is accessible by removing the plug 70', and this adjustment need be made only once when the booster mechanism is installed. In addition to determining the force necessary for unseating the valve element 58, the spring 52 also serves to unseat the vacuum valve element 75 when the parts are in the "off" position.

In order to reduce to a minimum the pedal-generated pressure necessary to unseat the valve element 58, the residual pressure retaining valve mechanism has been moved from the master cylinder to the outlet of the chamber 27. Of course, this change is not essential and the valve mechanism shown very smoothly cuts in the motor even if the residual pressure valve is placed at the outlet end of the master cylinder. However, in motor vehicles employing hard low friction brake linings it is desirable to reduce as far as possible the braking effort of the vehicle and it is particularly for such installations that the residual pressure valve is arranged in the outlet of the chamber 27. With conventional valve mechanisms, however, this is impracticable since if the spring means tending to seat the air valve 58 is made as light as desirable, the low pressure in the motor chamber 84 will hold the vacuum valve in a closed position thereby locking the brakes in a partially applied position.

In order to overcome the difficulty referred to, the spring 80 (Figure 4) is so arranged with respect to the vacuum valve 75 that differential pressures tend to open rather than to close the valve 75, this valve being urged to closed position by the spring 80 rather than by differential pressures. This arrangement therefore eliminates a serious difficulty involved in providing for a light "cut-in" master cylinder pressure.

If desired, the vacuum valve arrangement shown in Figure 5 may be employed, but not under the conditions referred to. In this case, both the spring 119 and the differential pressures affecting the valve 116 tend to close the latter, and this installation is satisfactory in some cases. The construction shown in Figure 4, however, is preferred. It will be noted that in both forms of the vacuum valve arrangement an economical type of poppet valve is employed, as in the case of the air valve, and the valve is rocked from its seat to provide a finer graduation in the operation of the motor.

From the foregoing it will be apparent that the form of the invention shown in Figures 1 to 5 inclusive is highly advantageous for several definite and important reasons. Both of the valves (Figure 4) are located in a central chamber at the end of the lever 95 opposite its fulcrum point, thus providing for a high ratio of valve movement to movement of the control piston 28. Thus an extremely rapid motor response is provided and the tendency toward a "lumpy" operation and the "over shooting" of the motor at the "cut-in" point is eliminated. The "cut-in" pressure is readily adjustable in accordance with individual installations by adjustment of the plug 49. This is valuable since it provides for adjustment in individual makes and types of vehicles in accordance with the line pressure necessary to set the brake shoes against the brake drums before operation of the booster motor is initiated.

Moreover, the present construction makes it impossible for both the air and vacuum valves of the motor to be operated at the same time upon motor operation, the vacuum valve being positively released for movement to closed position before any movement is transmitted to the air valve to open it. Therefore there is no dependency on relative spring pressures in the operation of these valves. The working of the spring 62 against atmospheric pressure rather than with such pressure is a highly important factor in reducing the pressure necessary to "cut-in" the motor, and the tilting of the valves is important since it provides for graduation in the movement of air through the valves with much greater accuracy than can be obtained with the direct opening and closing of poppet valves. This provides for a very fine control of the booster action on light brake applications at slow speeds, which cannot be obtained with any prior constructions.

The form of the device shown in Figures 6 and 7 is an advantageous alternative construction, but it does not possess all of the distinct advantages of the construction shown in Figures 1 to 5 inclusive. In Figure 6, opposite ends of the lever 139 are employed for respectively operating the air and vacuum valves, thus limiting valve movement to a 2:1 ratio, as in the construction of the copending application referred to above. The vacuum valve 146 operates in the same manner as the vacuum valve of the Klimkiewicz apparatus, initial movement of the plunger 28 swinging the lever about its upper end to seat the valve 146, whereupon the lower end of the lever becomes the fulcrum end and the upper end of the lever operates the rod 138 to rock the valve element 130 to admit air into the motor chamber 85. Such an arrangement is advantageous over prior constructions so far as the air valve is concerned since atmospheric pressure and the force of the spring 133 act in opposition, thus eliminating the necessity for building up a substantial pressure for opening the air valve followed by a sudden drop in pressure after the air valve has been opened. The arrangement in Figure 6 accordingly is highly advantageous over prior constructions in providing a smoother "cut-in" of the motor, although the construction does not possess all of the advantages of the preferred form of the invention as discussed above. Otherwise, the form of the invention shown in Figures 6 and 7 operates in substantially the same manner as the form previously described.

It will be noted that as to the air and vacuum valves in Figures 1 to 5 inclusive, and as to the air valve in Figure 6, a lever advantage is provided for the opening of such valves by virtue of the transmission of force to the valve stems at an angle thereto. Each of these valves operates as a lever fulcruming at the edges of the valves opposite the sides which open, thus requiring much less force to open the valves than is true of direct opening poppet valves.

It is to be understood that the forms of my invention herewith shown and described are to be taken as preferred examples of the same and that various changes in the shape, size and arrangement of parts may be resorted to without departing from the spirit of the invention or the scope of the subjoined claims.

I claim:

1. In an operating mechanism for a hydraulic brake system having wheel cylinders to apply the brakes and a pedal controlled master cylinder, a booster unit connected between the master cylinder and the wheel cylinders and comprising a pressure chamber communicating with the wheel cylinders, a fluid pressure motor having a pressure responsive unit therein to boost the pressure in said chamber upon energization of said motor, valve means for controlling differential pressures in said motor, and means operable by fluid displaced from the master cylinder for operating said valve means and cooperating with said motor to increase pressures in said chamber, said valve means comprising a valve for controlling the flow of fluid from a source of relatively high pressure into one side of said motor and a spring acting against such valve, said spring and the pressure of said source constituting two forces acting oppositely against said valve with one of said forces exceeding the other and tending to seat said valve whereby the power necessary to unseat said valve need only overcome the difference between said two forces.

2. In an operating mechanism for a hydraulic brake system having wheel cylinders to apply the brakes and a pedal controlled master cylinder, a booster unit connected between the master cylinder and the wheel cylinders and comprising a pressure chamber communicating with the wheel cylinders, a fluid pressure motor having a pressure responsive unit therein to boost the pressure in said chamber upon energization of said motor, valve means for controlling differential pressures in said motor, and means operable by fluid displaced from the master cylinder for operating said valve means and cooperating with said motor to increase pressures in said chamber, said valve means comprising a valve for controlling the flow of fluid from a source of relatively high pressure into one side of said motor and a spring acting against such valve to tend to seat it against the pressure of said source, the force exerted by said spring tending to seat said valve exceeding the pressure exerted by the source tending to unseat said valve whereby the force necessary to unseat said valve need overcome only the difference between the force of said spring and the pressure of said source tending to unseat said valve.

3. In an operating mechanism for a hydraulic brake system having wheel cylinders to apply the brakes and a pedal controlled master cylinder, a booster unit connected between the master cylinder and the wheel cylinders and comprising a fluid pressure motor having a pressure responsive unit therein to boost the pressure transmitted to the wheel cylinders upon energization of said motor, valve means for controlling differential pressures in said motor, means in said booster movable by fluid displaced from the master cylinder and operable for assisting said motor in boosting the pressure in the wheel cylinders, said movable means having connection with said valve means to effect operation thereof, said valve means comprising a valve for controlling the flow of fluid from a source of relatively high pressure into one side of said motor and a spring acting against such valve, said spring and the pressure of said source constituting two forces acting oppositely on said valve with one force exceeding the other to normally seat said valve whereby movement of said movable means by fluid displaced from the master cylinder need overcome only the difference between said two forces to open said valve.

4. In an operating mechanism for a hydraulic brake system having wheel cylinders to apply the brakes and a pedal controlled master cylinder, a booster unit connected between the master cylinder and the wheel cylinders and comprising a fluid pressure motor having a pressure responsive unit therein to boost the pressure transmitted to the wheel cylinders upon energization of said motor, valve means for controlling differential pressures in said motor, means in said booster movable by fluid displaced from the master cylinder and operable for assisting said motor in boosting the pressure in the wheel cylinders, said movable means having connection with said valve means to effect operation thereof, said valve means comprising a valve for controlling the flow of fluid from a source of relatively high pressure into one side of said motor and a spring acting against such valve to tend to seat said valve, the pressure of said source acting oppositely on said valve to tend to open it and being exceeded by the force of said spring whereby movement of said movable means to open said valve need overcome only the difference between the force of said spring and the pressure of said source tending to open said valve.

5. In an operating mechanism for a hydraulic brake system having wheel cylinders to apply the brakes and a pedal-controlled master cylinder, a booster unit connected between the master cylinder and the wheel cylinders and comprising a fluid pressure motor having a pressure responsive unit therein to boost the pressure transmitted to the wheel cylinders upon energization of said motor, valve means for controlling differential pressures in said motor, means in said booster movable by fluid displaced from the master cylinder and operable for assisting said motor in boosting the pressure in the wheel cylinders, said movable means having connection with said valve means to effect operation thereof, said valve means comprising a valve for controlling the flow of fluid from a source of relatively high pressure into one side of said motor and a spring acting against such valve, said spring and the pressure of said source constituting two forces acting oppositely on said valve with one force exceeding the other to normally seat said valve, a second spring operable to tend to oppose opening movement of said valve, and means for adjusting the tension of said second spring to vary the force required for opening said valve.

6. In an operating mechanism for a hydraulic brake system having wheel cylinders to apply the brakes and a pedal controlled master cylinder, a booster unit connected between the master cylinder and the wheel cylinders and comprising a fluid pressure motor having a pressure responsive unit therein to boost the pressure transmitted to the wheel cylinders upon energization of said motor, valve means for controlling differential pressures in said motor, means in said booster movable by fluid displaced from the master cylinder and operable for assisting said motor in boosting the pressure in the wheel cylinders, said movable means having connection with said valve means to effect operation thereof, said valve means comprising a valve for controlling the flow of fluid from a source of relatively high pressure into one side of said motor and a spring acting against such valve to tend to seat said valve, the pressure of said source acting oppositely on said valve to tend to open it and being exceeded by the force of said spring, a second spring operable to tend to oppose opening movement of said valve, and means for adjusting the tension of said second spring to vary the force required for opening said valve.

7. In an operating mechanism for a hydraulic brake system having wheel cylinders to apply the brakes and a pedal-controlled master cylinder, a booster unit comprising a low pressure hydraulic chamber communicating with the master cylinder, a higher pressure hydraulic chamber communicating with the wheel cylinders, a differential fluid pressure motor having a pressure movable unit including a portion projecting into said higher pressure chamber to boost the pressure therein upon energization of said motor, a plunger having one end arranged in said low pressure chamber and having its other end projecting into said higher pressure chamber to displace fluid therefrom upon movement of said plunger, and valve means operable by said plunger for energizing said motor and including a valve for controlling the admission of fluid from a relatively high pressure source to one side of said motor to energize it, and a spring acting against said valve while the pressure in said source acts oppositely against said valve, said spring and the pressure in said source constituting a pair of forces one of which is greater than the other and tends to seat said valve whereby the force transmitted from said plunger to said valve to open it need overcome only the difference between said two forces.

8. In an operating mechanism for a hydraulic brake system having wheel cylinders to apply the brakes and a pedal-controlled master cylinder, a booster unit comprising a low pressure hydraulic chamber communicating with the master cylinder, a higher pressure hydraulic chamber communicating with the wheel cylinders, a differential fluid pressure motor having a pressure movable unit including a portion projecting into said higher pressure chamber to boost the pressure therein upon energization of said motor, a plunger having one end arranged in said low pressure chamber and having its other end projecting into said higher pressure chamber to displace fluid therefrom upon movement of said plunger, and valve means operable by said plunger for energizing said motor and including a valve for controlling the admission of fluid from a relatively high pressure source to one side of said motor to energize it, and a spring acting against said valve to tend to close it, the pressure of said source acting oppositely against said valve to tend to open it, the force of said spring exceeding the pressure of said source tending to open said valve whereby the force necessary to move said plunger to open said valve need overcome only the difference between the force of said spring and the force of said source tending to unseat said valve.

9. In an operating mechanism for a hydraulic brake system having wheel cylinders to apply the brakes and a pedal-controlled master cylinder, a booster unit comprising a low pressure hydraulic chamber communicating with the master cylinder, a higher pressure hydraulic chamber communicating with the wheel cylinders, a differential fluid pressure motor having a pressure movable unit including a portion projecting into said higher pressure chamber to boost the pressure therein upon energization of said motor, a plunger having one end arranged in said low pressure chamber and having its other end projecting into said higher pressure chamber to displace fluid therefrom upon movement of said plunger, said plunger having a passage therethrough affording communication between said chambers when said plunger is in its "off" position, means for closing said passage upon movement of said plunger from such position, and valve means operable by said plunger for energizing said motor and including a valve for controlling the admission of fluid from a relatively high pressure source to one side of said motor to energize it, and a spring acting against said valve while the pressure in said source acts oppositely against said valve, said spring and the pressure in said source constituting a pair of forces one of which is greater than the other and tends to seat said valve whereby the force transmitted from said plunger to said valve to open it need overcome only the difference between said two forces.

10. In an operating mechanism for a hydraulic brake system having wheel cylinders to apply the brakes and a pedal-controlled master cylinder, a booster unit comprising a low pressure hydraulic chamber communicating with the master cylinder, a higher pressure hydraulic chamber communicating with the wheel cylinders, a differential fluid pressure motor having a pressure movable unit including a portion projecting into said higher pressure chamber to boost the pressure therein upon energization of said motor, a plunger having one end arranged in said low pressure chamber and having its other end projecting into said higher pressure chamber to displace fluid therefrom upon movement of said plunger, said plunger having a passage therethrough affording communication between said chambers when said plunger is in its "off" position, means for closing said passage upon movement of said plunger from such position, and valve means operable by said plunger for energizing said motor and including a valve for controlling the admission of fluid from a relatively high pressure source to one side of said motor to energize it, and a spring acting against said valve to tend to close it, the pressure of said source acting oppositely against said valve to tend to open it, the force of said spring exceeding the pressure of said source tending to open said valve whereby the force necessary to move said plunger to open said valve need overcome only the difference between the force of said spring and the force of said spring tending to unseat said valve.

11. In an operating mechanism for a hydraulic brake system having wheel cylinders to apply the brakes and pedal-controlled master cylinder, a booster unit comprising a low pressure hydraulic chamber communicating with the master cylinder, a higher pressure hydraulic chamber communicating with the wheel cylinders, a differential fluid pressure motor having a pressure movable unit including a portion projecting into said higher pressure chamber to boost the pressure therein upon energization of said motor, a plunger having one end arranged in said low pressure chamber and having its other end projecting into said higher pressure chamber to displace fluid therefrom upon movement of said plunger, and valve means operable by said plunger for energizing said motor and including a valve for controlling the admission of fluid from a relatively high pressure source to one side of said motor to energize it, a spring acting against said valve to tend to close it, the pressure of said source acting oppositely against said valve to tend to open it, the force of said spring exceeding the pressure of said source tending to open said valve, a second spring operable to tend to oppose opening movement of said valve, and means for adjusting the tension of said spring to vary the force necessary for opening said valve.

12. In an operating mechanism for a hydraulic brake system having wheel cylinders to apply the brakes and a pedal-controlled master cylinder, a booster unit comprising a low pressure hydraulic chamber communicating with the master cylinder, a higher pressure hydraulic chamber communicating with the wheel cylinders, a differential fluid pressure motor having a pressure movable unit including a portion projecting into said higher pressure chamber to boost the pressure therein upon energization of said motor, a plunger in said low pressure chamber movable by fluid displaced from the master cylinder, valve means operable by said plunger for energizing said motor, said valve means including a valve and a seat against which it engages for controlling the admission of fluid from a relatively high pressure source to one side of said motor to energize it, and a spring acting against said valve while the pressure in said source acts oppositely against said valve, said spring and the pressure in said source constituting a pair of forces one of which is greater than the other and tends to seat said valve, said valve being of the poppet type and having a valve stem projecting axially therefrom, and means for transmitting motion from said plunger to said valve stem at an angle thereto to rock said valve on its seat upon movement of said plunger from its "off" position.

13. In an operating mechanism for a hydraulic brake system having wheel cylinders to apply the brakes and a pedal-controlled master cylinder, a booster unit comprising a low pressure hydraulic chamber communicating with the master cylinder, a higher pressure hydraulic chamber communicating with the wheel cylinders, a differential fluid pressure motor having a pressure movable unit including a portion projecting into said higher pressure chamber to boost the pressure therein upon energization of said motor, a plunger in said low pressure chamber movable by fluid displaced from the master cylinder, valve means operable by said plunger for energizing said motor, said valve means including a valve and a seat against which it engages for controlling the admission of fluid from a relatively high pressure source to one side of said motor to energize it, and a spring acting to seat said valve against the pressure in said source and exceeding the pressure of the source tending to unseat said valve, said valve being of the poppet type and having a valve stem projecting axially therefrom, and means for transmitting movement from said plunger to said valve stem at an angle thereto to rock said valve on its seat upon movement of said plunger from its "off" position.

14. In an operating mechanism for a hydraulic brake system having wheel cylinders to apply the brakes and a pedal-controlled master cylinder, a booster unit comprising a low pressure hydraulic cylinder communicating with the master cylinder, a higher pressure hydraulic cylinder communicating with the wheel cylinders, a differential fluid pressure motor having a casing and a pressure movable unit therein including a portion projecting into said higher pressure cylinder to boost the pressure therein upon energization of said motor, said casing having one side communicating with the source of lower pressure, a plunger having one end arranged in said low pressure cylinder and its other end projecting into said higher pressure cylinder to displace fluid therefrom upon movement of said plunger by fluid displaced into said low pressure cylinder from the master cylinder, a pair of valves one of which controls communication between opposite sides of said motor and the other of which controls communication between a source of higher fluid pressure and the other side of said motor, means biasing each of said valves to closed position, a valve actuating element, a biasing spring engaging said element and normally moving the latter to a position unseating the first named valve, and, means operable upon movement of said plunger from its "off" position for moving said valve operating element against its biasing spring to free said first named valve for seating movement, said valve operating element normally having lost motion connection with the second named valve whereby it engages such valve to open it only after the first named valve has become seated.

15. Apparatus constructed in accordance with claim 14 wherein the spring which normally tends to seat the second named valves acts in opposition to and normally overcomes the pressure of the source tending to overcome such spring, and means for varying the tension of the biasing spring of said valve operating element.

16. Apparatus constructed in accordance with claim 14 wherein both valves are of the poppet type and are provided with axially extending stems, said valve operating element being notched for engagement with said stems whereby movement of said valve operating element effects the rocking of said valves relative to their seats, and means for varying the tension of the biasing spring of said valve operating element.

17. In an operating mechanism for a hydraulic brake system having wheel cylinders to apply the brakes and a pedal-controlled master cylinder, a booster unit comprising a low pressure hydraulic cylinder communicating with the master cylinder, a higher pressure hydraulic cylinder communicating with the wheel cylinders, a differential fluid pressure motor having a casing and a pressure movable unit therein including a portion projecting into said higher pressure cylinder to boost the pressure therein upon energization of said motor, said casing having one side communicating with a source of lower pressure, a plunger having one end arranged in said low pressure cylinder and its other end projecting into said higher pressure cylinder to displace fluid therefrom upon movement of said plunger by fluid displaced into said low pressure cylinder from the master cylinder, a pair of valves arranged to one side of the axis of said motor, one valve controlling communication between opposite sides of said motor and the other controlling communication between the other side of said motor and a source of higher pressure, means biasing said valves to closed position, both valves being of the poppet type and having axial valve stems projecting generally toward each other, a valve operating element linearly movable at an angle to said valve stems and notched for engagement therewith, and a valve operating lever having one end engageable with said valve operating element and being operable by said plunger upon movement thereof from its "off" position to actuate said valve operating element.

WILLIAM F. PENROSE.